United States Patent
Veenendall et al.

(10) Patent No.: US 11,819,974 B2
(45) Date of Patent: Nov. 21, 2023

(54) GRINDING POSITIONING PLATE FOR REEL-TYPE MOWER UNIT

(71) Applicant: Foley United LLC, River Falls, WI (US)

(72) Inventors: Gregory Veenendall, River Falls, WI (US); Matthew Hauser, River Falls, WI (US)

(73) Assignee: Foley United LLC, River Falls, WI (US)

( * ) Notice: Subject to any disclaimer, the term of this patent is extended or adjusted under 35 U.S.C. 154(b) by 830 days.

(21) Appl. No.: 16/780,335

(22) Filed: Feb. 3, 2020

(65) Prior Publication Data

US 2020/0246932 A1    Aug. 6, 2020

Related U.S. Application Data

(60) Provisional application No. 62/799,937, filed on Feb. 1, 2019.

(51) Int. Cl.
  *B24B 3/42*   (2006.01)
  *A01D 34/54*  (2006.01)
  *B24B 3/36*   (2006.01)

(52) U.S. Cl.
  CPC ............... *B24B 3/42* (2013.01); *A01D 34/54* (2013.01); *B24B 3/36* (2013.01)

(58) Field of Classification Search
  CPC ........... B24B 3/42; B24B 3/365; B24B 3/368; B24B 3/363; A01D 75/08
  USPC ....... 451/141, 421, 403, 404, 365, 372, 373, 451/371, 368, 248, 235
  See application file for complete search history.

(56) References Cited

U.S. PATENT DOCUMENTS

| | | | | |
|---|---|---|---|---|
| 1,967,118 A | * | 7/1934 | Glasgow | B24B 3/42 |
| | | | | 451/152 |
| 2,314,945 A | * | 3/1943 | Maynard | B24B 3/42 |
| | | | | 74/27 |
| 2,688,888 A | * | 9/1954 | Whitworth | A01D 75/08 |
| | | | | 76/82.1 |
| 2,747,344 A | * | 5/1956 | Kickbush | B24B 3/42 |
| | | | | 451/443 |
| 2,786,370 A | * | 3/1957 | Osborn | B24B 3/42 |
| | | | | 76/82.1 |
| 4,148,158 A | * | 4/1979 | Hewitt | B24B 3/42 |
| | | | | 451/141 |

(Continued)

FOREIGN PATENT DOCUMENTS

CN    107877024 A  *  4/2018

OTHER PUBLICATIONS

CN-107877024-A EspaceNet English Translation (Year: 2018).*

Primary Examiner — Joel D Crandall
Assistant Examiner — Makena S Markman
(74) Attorney, Agent, or Firm — Dicke, Billig & Czaja, PLLC

(57) ABSTRACT

One example provides a grinding positioning plate for a reel-type mower unit including a cutting reel having a rotational axis. The grinding positioning plate includes a main body including a pivot element having a pivot axis, and at least one pair of clamping assemblies, each clamping assembly to clamp to a corresponding mounting flange of the reel-type mower unit to mount the main body to reel-type mower unit such that the pivot axis is in parallel with the rotational axis and at a known horizontal distance from the rotational axis.

8 Claims, 19 Drawing Sheets

(56) References Cited

U.S. PATENT DOCUMENTS

| | | | |
|---|---|---|---|
| 6,393,712 | B1 | 5/2002 | Jansson |
| 6,935,937 | B2 | 8/2005 | Port |
| 7,231,849 | B2 * | 6/2007 | Beattie ..................... B24B 3/42 83/174 |
| 7,987,608 | B2 | 8/2011 | Rowe |
| 8,834,236 | B2 | 9/2014 | Eklund |
| 8,926,408 | B2 | 1/2015 | Hasegawa |
| 9,138,850 | B2 | 9/2015 | Walker |
| 9,776,297 | B2 | 10/2017 | Veenendall et al. |

\* cited by examiner

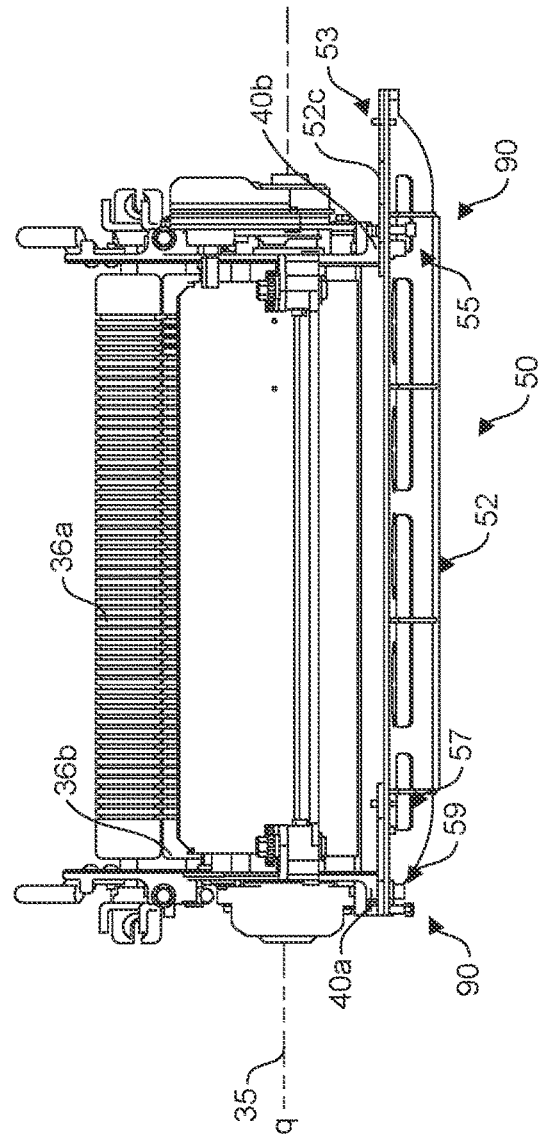
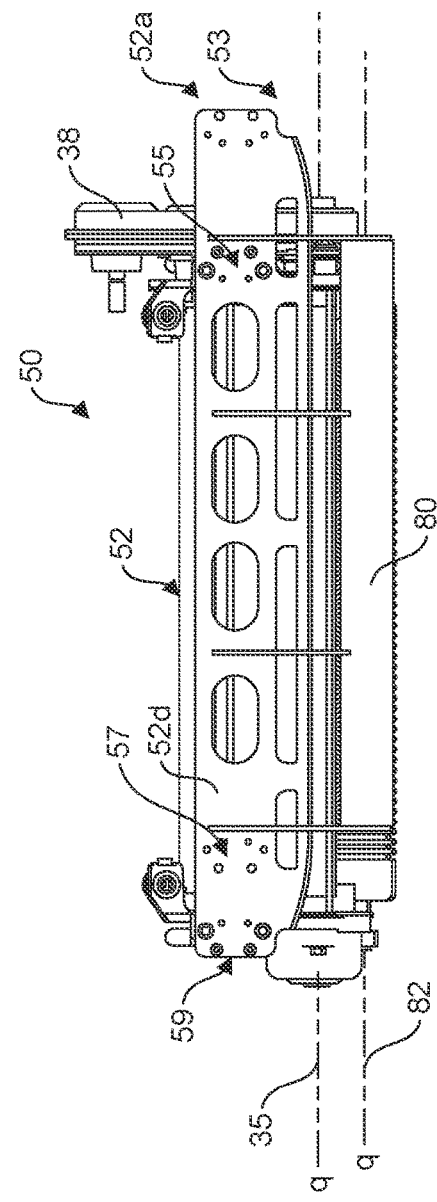
FIG. 13C
FIG. 13D

GRINDING POSITIONING PLATE FOR REEL-TYPE MOWER UNIT

CROSS-REFERENCE TO RELATED APPLICATION

This application claims the benefit of U.S. Provisional Application No. 62/799,937, filed on Feb. 1, 2019, hereby incorporated herein in its entirety by reference.

BACKGROUND

Commercial mowers, such as those used for maintaining golf courses, often use reel-type mowing units which employ cylindrical cutting reels having a number of helical blades disposed about a central shaft. To maintain optimal cutting performance, commercial grinding systems have been developed to sharpen the helical blades of such cutting reels. In order to sharpen the blades of cutting reels according to OEM (original equipment manufacturer) specifications, a cutting reel must be properly aligned with a grinding wheel(s) of the grinding system.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIGS. 13A through 13D illustrate perspective, side, top, and front views of a grinding positioning plate for a reel-type mower unit in an installed position, according to one example.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Commercial mowers, such as those used for maintaining golf courses, often use reel-type mowing units which employ cylindrical cutting reels having a number of helical blades disposed about a central shaft. To maintain optimal cutting performance, commercial grinding systems have been developed to sharpen the helical blades of such cutting reels. In order to sharpen the blades of cutting reels according to OEM (original equipment manufacturer) specifications, a cutting reel must be properly aligned with a grinding wheel(s) of the grinding system.

Figure 1A:
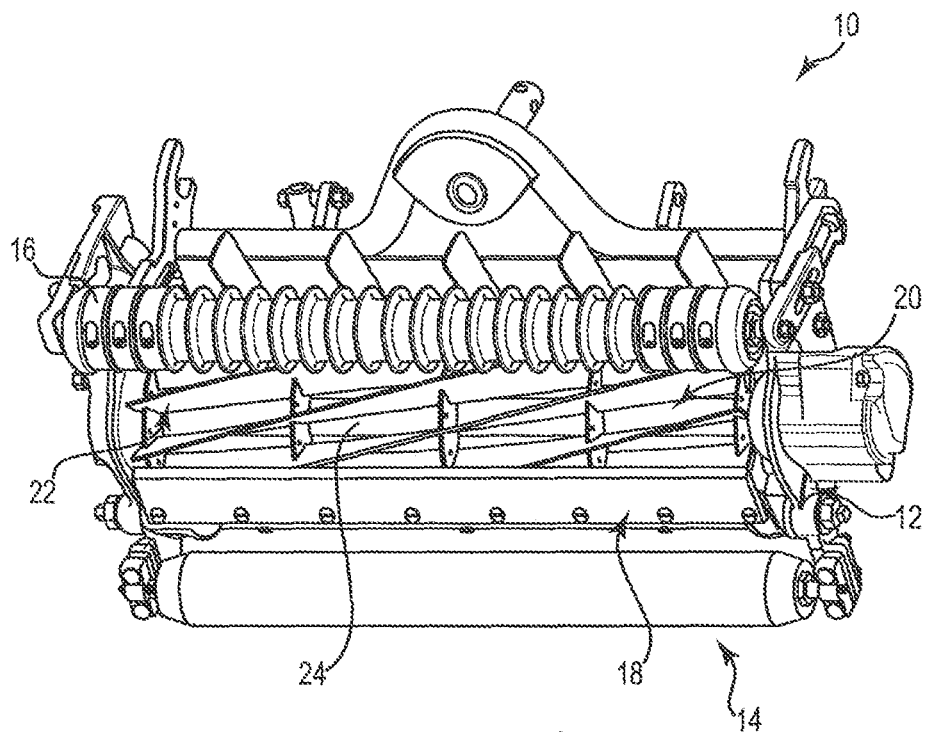
FIG. 1A is a perspective view of an example of a reel-type mower unit.

FIG. 1A is a bottom perspective view generally illustrating an example of typical reel-type mower unit 10. Reel-type mowing units, such as mower unit 10 typically include a frame structure 12 to which a rear roller 14, a front roller 16, a bedknife 18, and a cylindrical cutting reel 20 are mounted, wherein cutting reel 20 includes a number of helical blades 22 disposed about a shaft 24.

Figure 1B:
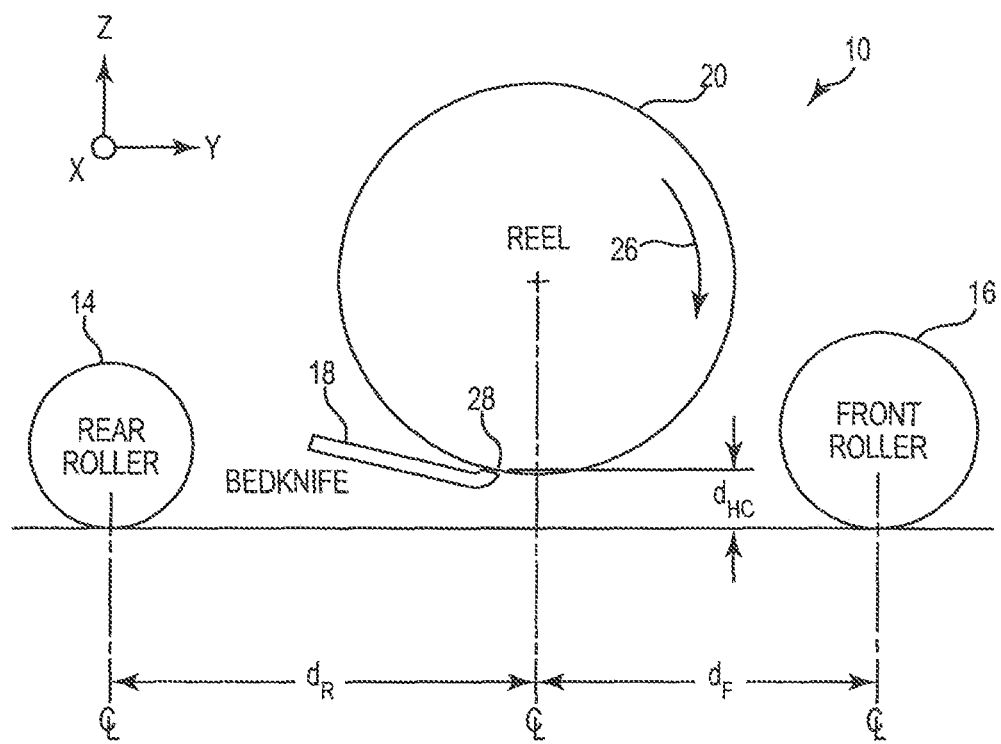
FIG. 1B is a schematic diagram generally illustrating a cross-sectional view of a reel-type mower unit, according to one example.

FIG. 1B is a simplified schematic diagram illustrating a cross-sectional view showing portions of a typical mower unit, such as mower unit 10. For ease of illustration, frame 12 is not shown in FIG. 1B. As reel 20 rotates, as indicated by rotational arrow 26, grass is cut at a sheer point 28 formed between the helical blades 22 and a leading edge of bedknife 18. A height of cut, $d_{HC}$, of the mower unit is typically adjusted by adjusting the vertical height (z-axis) of front roller 16 relative to central shaft 24 of cutting reel 20. A horizontal distance (y-axis) between a centerline of rear roller 14 and a centerline (i.e. axis of rotation) of cutting reel 20 is indicated as $d_R$, and a horizontal distance between a centerline of front roller 16 and the centerline of cutting reel 20 is indicated at $d_F$.

To position a cutting reel for grinding, some grinding systems secure to the front roller of mowing units, such as to front roller 16 of mower unit 10. However, different makes and models of mowing units often have different characteristics that require unique setup requirements. For example, the configuration of mowing unit components typically varies between mowing units from different manufactures, and often varies between cutting reels of different sizes from the same manufacturer, with each configuration requiring a different setup. To further complicate matters, the front roller is often moved to various positions by users to enable the installation of attachments to the front portion of the frame (e.g. combs, thatchers, groomers, etc.), thereby making access to the front roller difficult and resulting in front roller being at variable locations so that even mowing units of the same model from the same manufacturer often require a different setup for grinding.

In contrast to the front roller, such as front roller 16, where horizontal distance dF between the centerline of cutting reel 20 and front roller 16 may vary between mower units, horizontal distance dR between the centerline of the axis of the cutting reel and an axis of the rear roller is typically at a constant distance, or at least within a relatively narrow range of distances, for known makes and models of reel-type mowing units. Additionally, attachments and accessories, such as brushes, groomer, and thatchers, for example, are not typically mounted on the rear of the mowing units.

To provide quick, accurate, and consistent horizontal positioning (i.e., in a horizontal plane) of a cutting reel relative to a shaft of a grinding wheel, and thereby improve both "squaring/trueing" and relief grinding processes, one type of grinding system, as described by U.S. Pat. No. 9,776,297 (which is incorporated herein by reference), includes moveable mounting brackets that secure to the rear roller of a mower unit, such as rear roller 14 of mower unit 10 (or to another predetermined pivot point or rotational axis on the a rear portion of the frame of a mower unit that is at a known horizontal distance from an axis of the cutting reel). The mounting brackets are moveable in the horizontal plane (e.g., x-y plane) to one of a number of predetermined positions along a positioning axis based on known characteristics of the mower reel unit, such as the manufacturer of mower unit and a diameter of the cutting reel, for example, so as to place the cutting reel at an optimal position for grinding.

Figure 2:
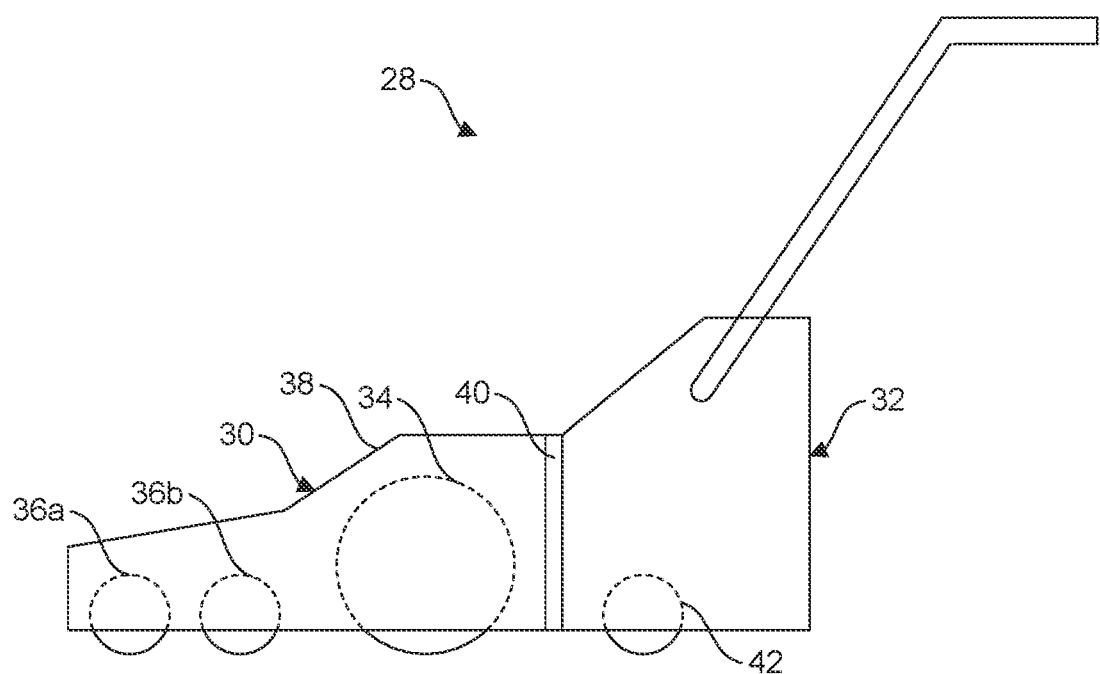
FIG. 2 is a block and schematic diagram generally illustrating a walk-behind mower including a reel-type mower unit, according to one example.

FIG. 2 is a block and schematic diagram generally illustrating an example of a known walk-behind type lawn mower 28 including a reel-type mowing unit 30 mounted to a drive assembly 32 (e.g., including a gas engine). As illustrated, similar to reel-type mowing unit 10, as generally illustrated by FIGS. 1A and 1B, reel-type mower unit 30 includes cutting reel 34 and a front roller 36 (in this case, a pair of front rollers 36a, 36b) mounted to a frame structure 36, where frame structure 38 includes a flange 40 for mounting reel-type mowing unit 30 to drive assembly 32. However, unlike reel-type mower unit 10, a rear roller 42 of lawn mower 30 is arranged as a component of drive assembly 32, not of reel-type mowing unit 30.

In one example, to sharpen cutting reel 34, reel-type mower unit 30 is removed from drive assembly 32. However, since rear roller 42 is a component of drive assembly 32, when removed for sharpening, reel-type mowing unit 30 does not include a rear roller to serve as mounting point for a rear-engaging grinding system, such as described by U.S. Pat. No. 9,776,297, which secures to a rear roller (or other mounting axis on a rear portion of a frame structure). Additionally, when detached from drive assembly 32, the absence of a rear roller enables frame structure 38 of reel-type mowing unit 30 to "flex", thereby making the grinding of the helical blades of cutting reel 34 difficult and inconsistent during a sharpening process.

Figure 3:
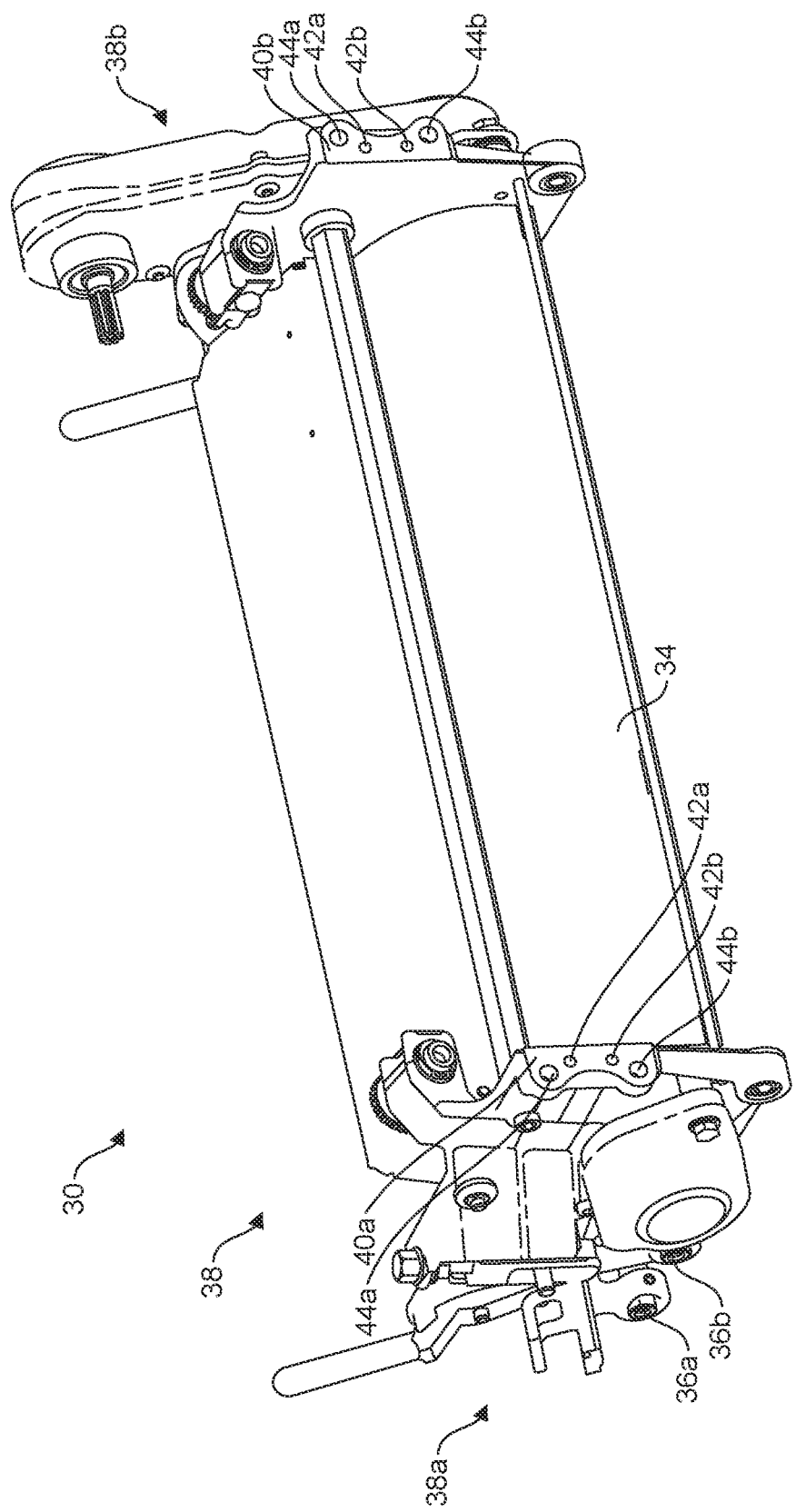
FIG. 3 is a perspective view of an example of a reel-type mower unit without a rear roller.

FIG. 3 is a perspective view illustrating an example of reel-type mower unit 30 after it has been removed from drive assembly 32 of walk-behind mower 28. In one example, frame structure 38 of the reel-type mower unit 30 has a first end 38a, and an opposing second end 38b. In one example, flange 40 includes a first flange 40a disposed at first end 38a of frame structure 36, and a second flange 40b disposed at second end 38b of frame structure 36, where flanges 40a and 40b are employed to mount reel-type mower unit 30 to drive assembly 32 of walk-behind lawn mower 28. In one example, each flange 40a and 40b includes a pair of fixturing apertures 42a and 42b which are to receive fixtures pins (not illustrated) disposed on drive assembly 32 so as to hold and align reel-type mower unit 30 with drive assembly 32 when reel-type mower unit 30 is being mounted thereto. In one example, each flange 40a and 40b further includes a pair of bolt holes 44a and 44b which are to receive bolts (not illustrated), or other suitable connecting devices, which secure frame structure 36 to drive assembly 32.

According to examples of the present disclosure, which will be described in greater detail below, a grinding positioning plate is provided which quickly and temporarily mounts to a frame structure of a reel-type mowing unit not having an integral rear roller, such as to frame structure 40 of reel-type mowing unit 30, after the mowing unit has been removed from the drive assembly. According to examples, the grinding positioning plate provides a pivot element which, after mounting of the grinding position plate to the frame structure, provides a pivot axis which is at a known horizontal distance from an axis of the cutting reel of the reel-type mowing unit. The pivot element/pivot axis is then employed as a mounting point for the mounting brackets of the above described grinding system of U.S. Pat. No. 9,776,297, or any similar such grinding system using predetermined fixed locations. In one example, the support plate includes a simulated rear roller that serves as the pivot element. In one example, the grinding positioning plate mounts to the frame structure using mounting holes by which the frame structure is mounted to a drive assembly, such as via fixturing apertures 42a/42b and bolt holes 44a/44b of frame structure 38 of reel-type mower unit 30. In one example, the grinding positioning plate includes a plurality of mounting positions such that the grinding positioning bracket can mount to reel-type mowing units having different widths.

Figure 4:
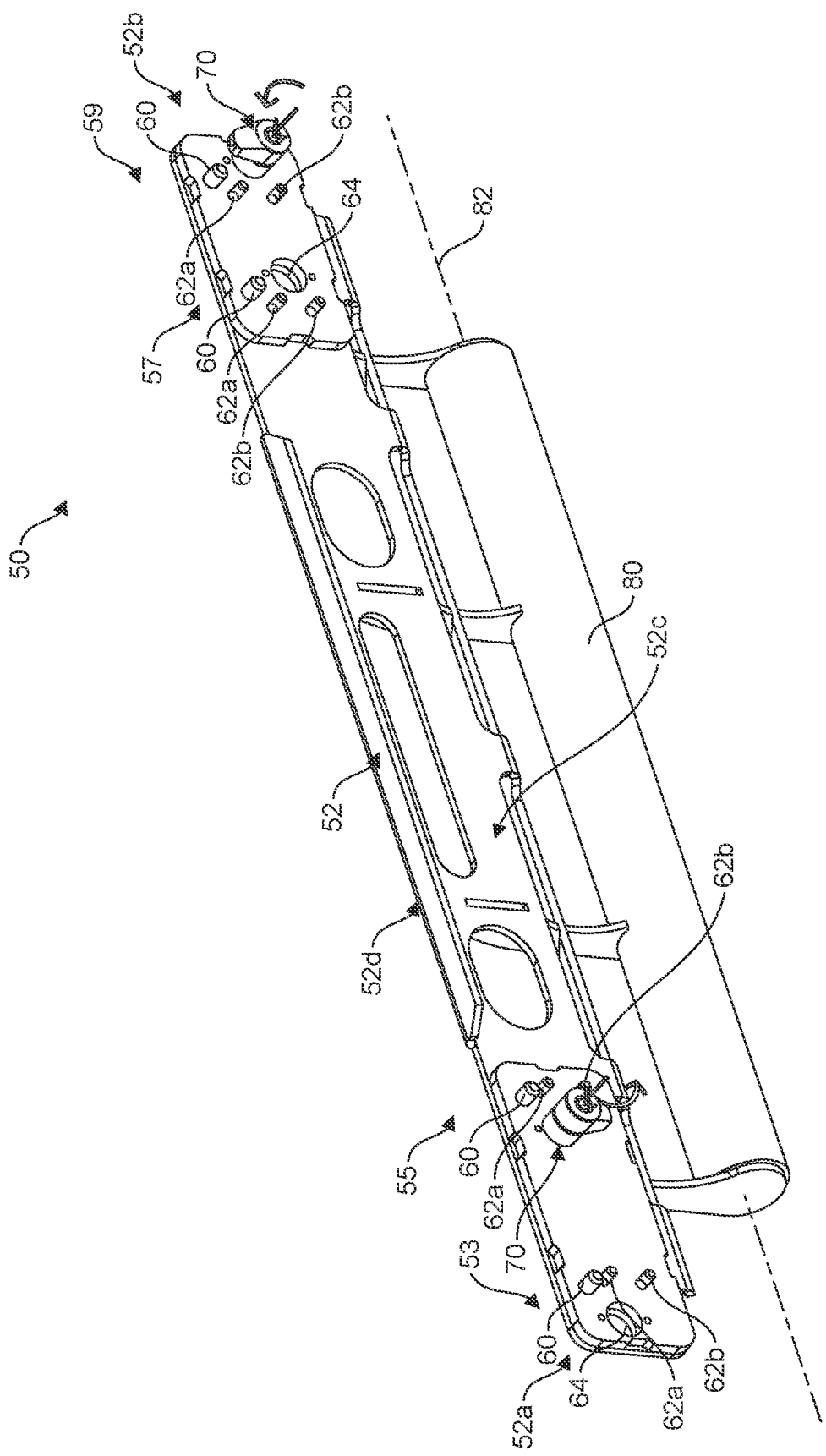
FIG. 4 is a perspective view illustrating a grinding positioning plate for a reel-type mower unit, according to one example.

FIGS. 4 through 9B generally illustrate a grinding positioning plate 50, according to one example of the present disclosure. FIG. 4 is a perspective view of grinding positioning plate 50, where grinding positioning plate 50 includes a support body 52 having opposing ends 52a and 52b, a front surface 52c, and a rear surface 52d. In one example, as illustrated, support body 52 comprises an elongated support plate 52. In one example, opposing ends 52a and 52b of support plate 52 each include two sets of mounting points, illustrated as mounting points 53, 55, 57, and 59. In one example, as illustrated, each of the mounting point sets 53, 55, 57, and 59 includes a rough alignment pin 60, a pair of fixturing pins 62a and 62b and, and a clamp orifice 64 to receive a clamp assembly 70, as illustrated by clamp assemblies 70a and 70b (which will be described in greater detail below).

In one example, as illustrated, support plate 52 includes a pivot element 80 having a longitudinal axis 82, where pivot element serves as a clamping point for a grinding system. In one example, as illustrated, pivot element 80 simulates a rear roller of a mower reel unit 30. It is noted that any number of suitable elements can be employed as pivot element 80, such as a pair of pins disposed at opposing ends 52a and 52b of support plate 52, for example.

With reference to FIG. 3, when mounting grinding positioning plate 50 to reel-type mower unit 30, for a given mounting point set, such as mounting point set 59, with front surface 52c of support plate 52 facing flange 40b of frame structure 38, rough alignment pin 60 is configured to insert into the upper bolt hole 44a of mounting flange 40b, and fixturing pins 62a and 62b are adapted to insert into fixturing apertures 42a and 42b. In one example, for each mounting point set, rough alignment pin 60 is longer than fixturing pins 62a and 62b. In one example, rough alignment pin 60 does not fit as tightly into the corresponding bolt hole 44a on corresponding mounting flange 40a/40b as do fixturing pins 62a and 62b, such that rough alignment pins 60 are configured to more easily engage the corresponding bolt hole 44a in the corresponding mounting flange 40a/40b and function to hold support plate 52 in place until the more tightly fitting fixturing pins can be inserted into the corresponding apertures 42a and 42b in corresponding mounting flange 40a/40b. As will be described in greater detail below, after grinding support plate 50 is mounted to frame structure 38 of reel-type mower unit 30, longitudinal axis 82 of pivot element 80 is positioned in parallel with a longitudinal axis of cutting reel 34.

Figure 5A:
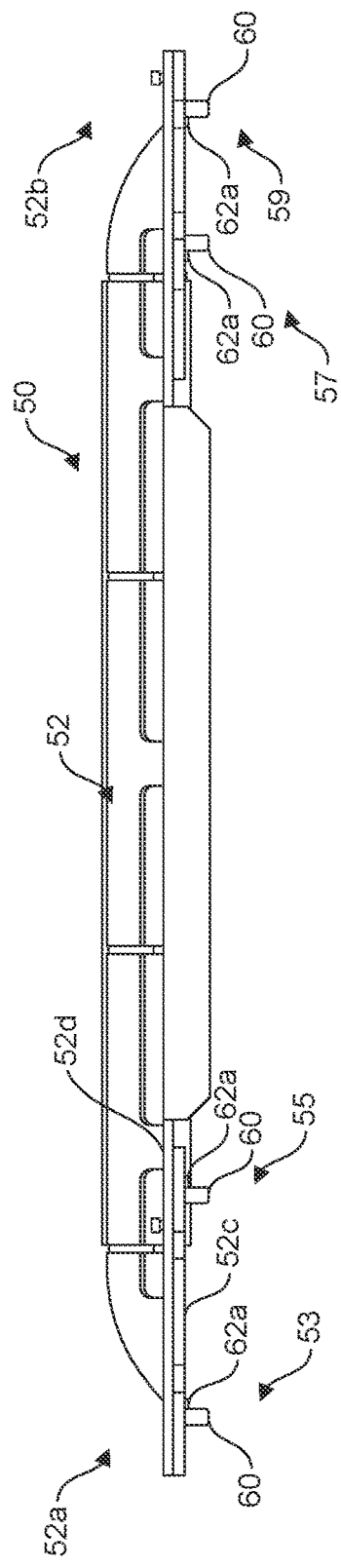
FIGS. 5A and 5B are top and front views illustrating a grinding positioning plate for a reel-type mower unit, according to one example.
Figure 5B:
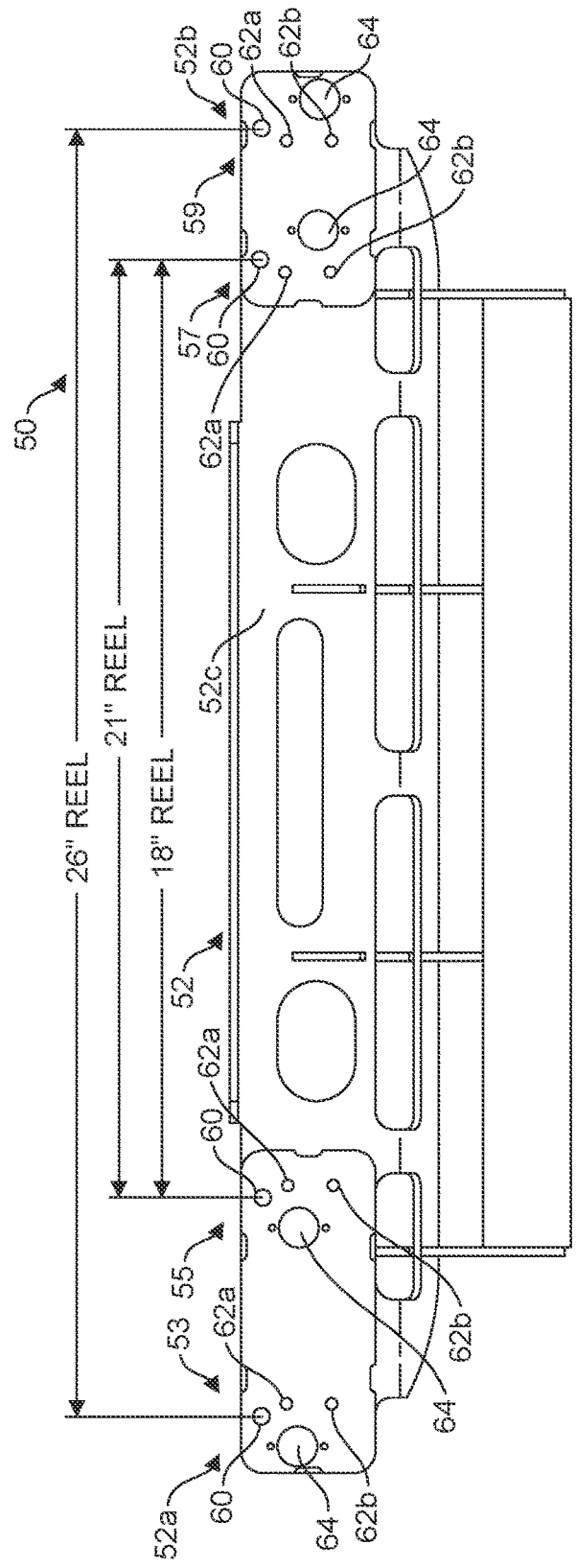

FIGS. 5A and 5B respectively illustrate top and front views of grinding positioning plate 50 of FIG. 4, according to one example. Reel-type mowing units, such as reel-type mowing unit 30 of FIG. 3, may have cutting reels 34 of different widths, such as 18-inch, 21-inch, and 26-inch widths, for example. In one example, different combinations of mounting point sets 53, 55, 57, and 59 are employed to mount grinding positioning plate 50 to reel-type mower units of different widths. According to one example, as illustrated, mounting point sets 55 and 57 correspond to an 18-inch wide reel-type mower unit, mounting point sets 55 and 59 correspond to a 21-inch wide reel-type mower unit, and mounting point sets 53 and 59 correspond to a 26-inch wide mower unit.

Figure 6:
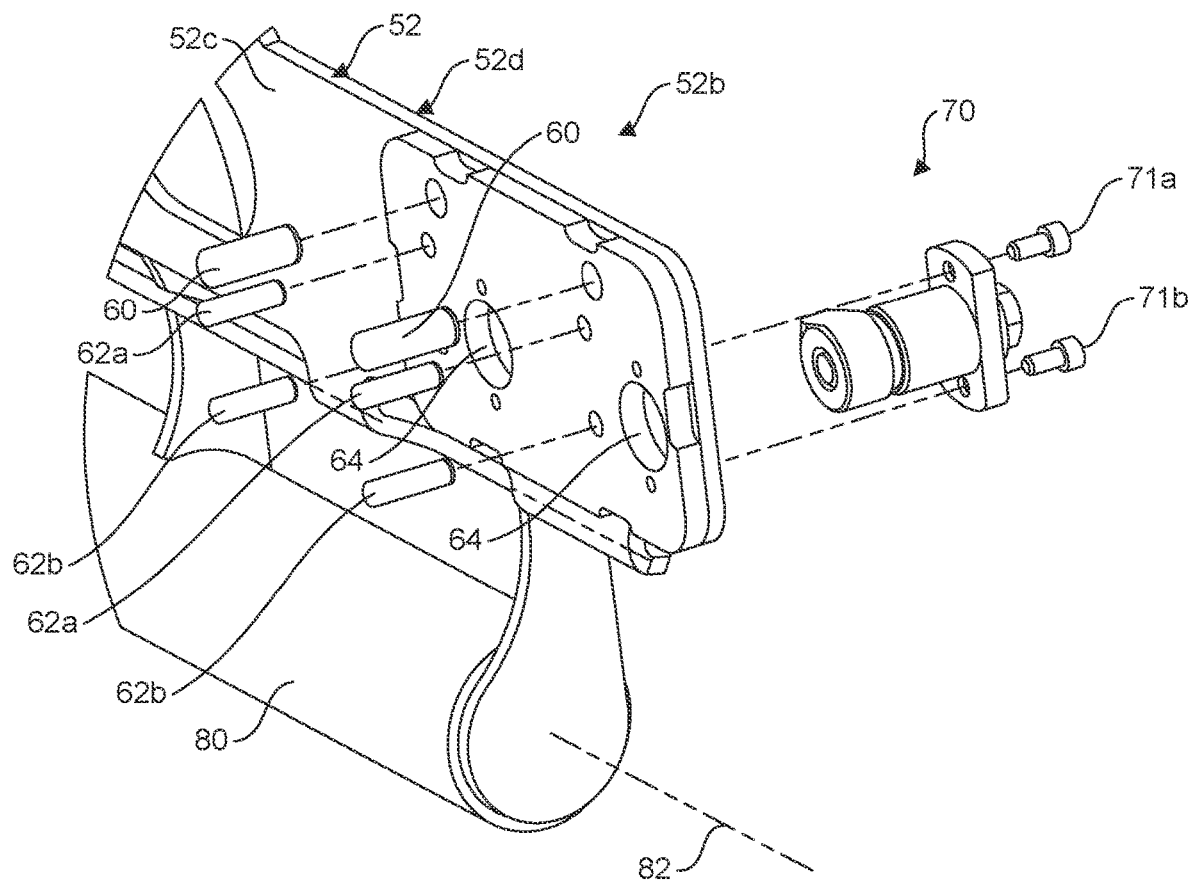
FIG. 6 is an exploded view of a portion of a grinding positioning plate including a clamping assembly, according to one example.
Figure 7:
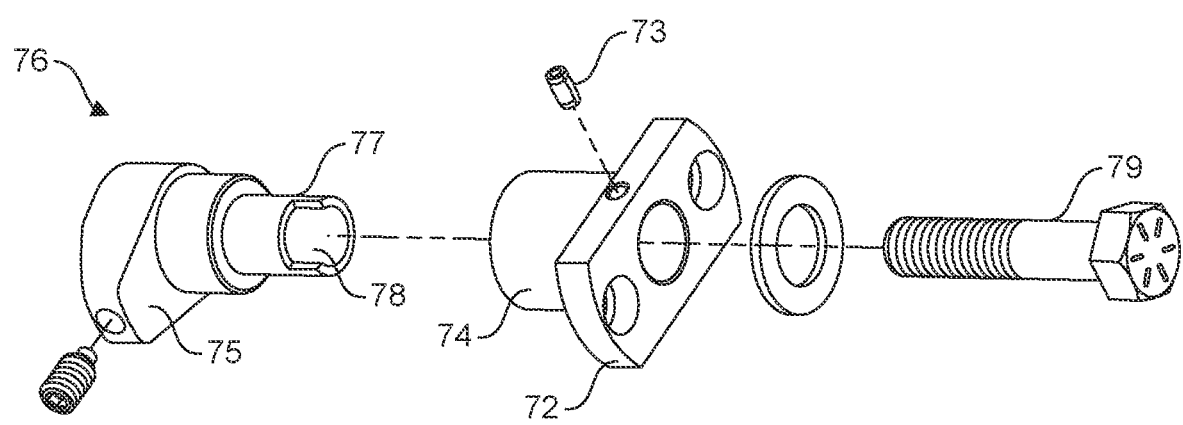
FIG. 7 is an exploded view of a rotary clamp assembly for use with a grinding positioning plate, according to one example.
Figure 8A:
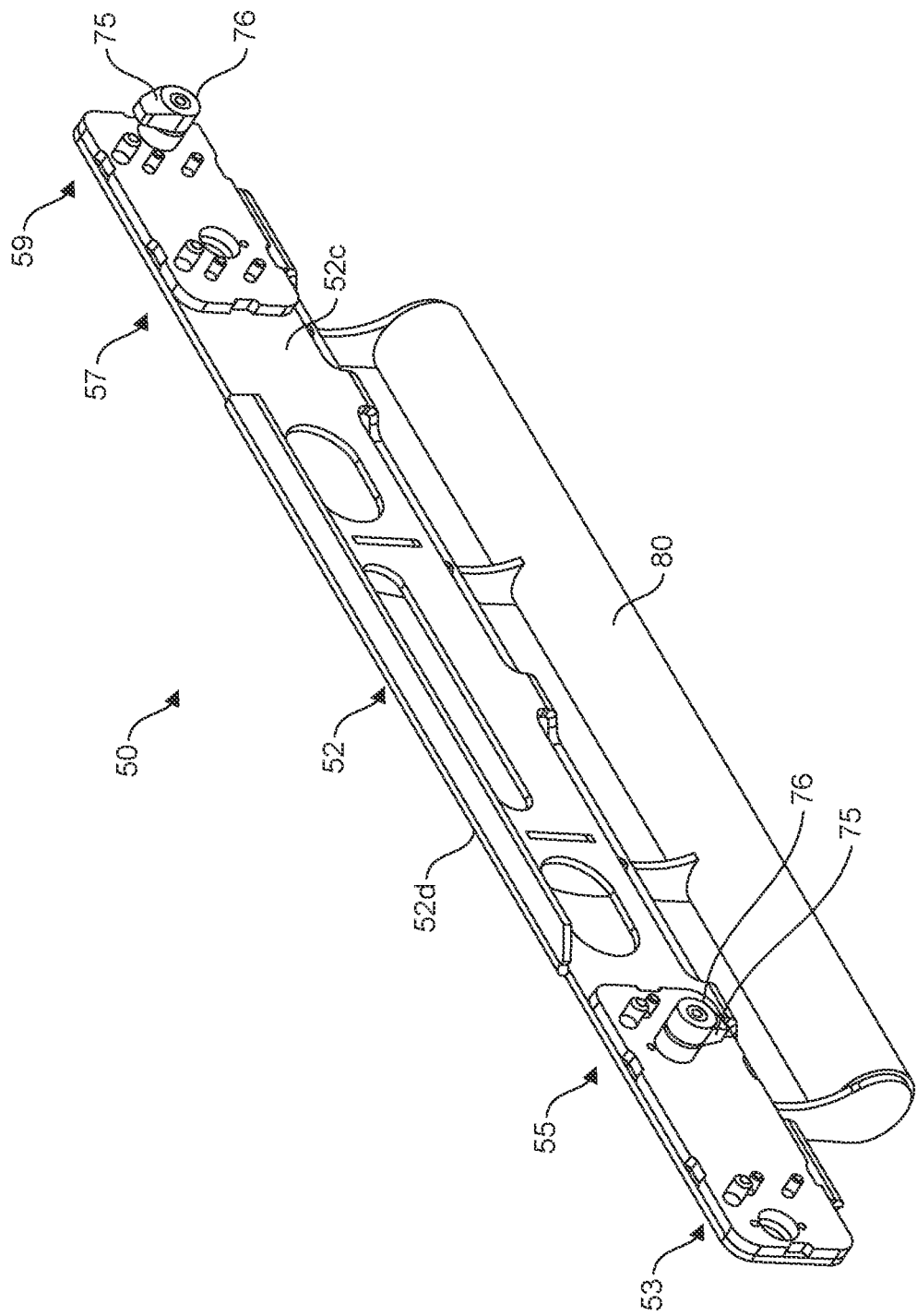
FIGS. 8A through 8D illustrate perspective, side, top, and front views of a grinding positioning plate for a reel-type mower unit in an uninstalled position, according to one example.
Figure 8B:
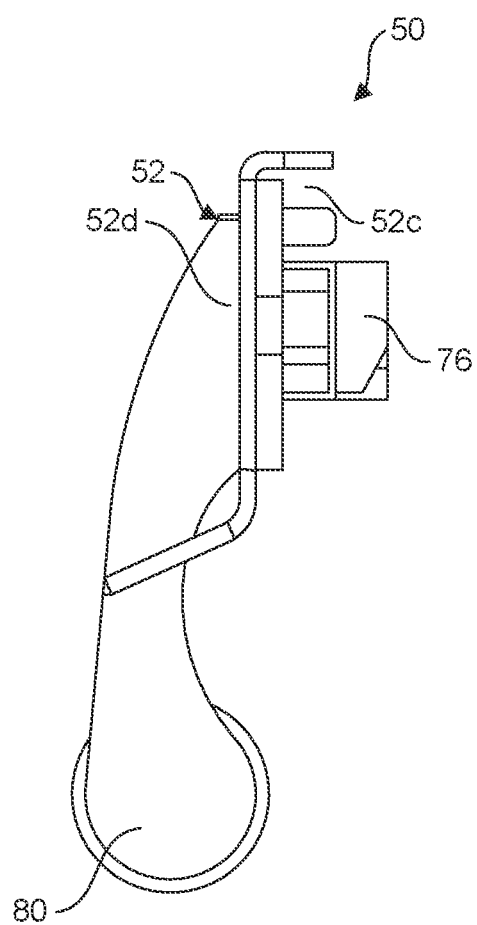
Figure 8C:
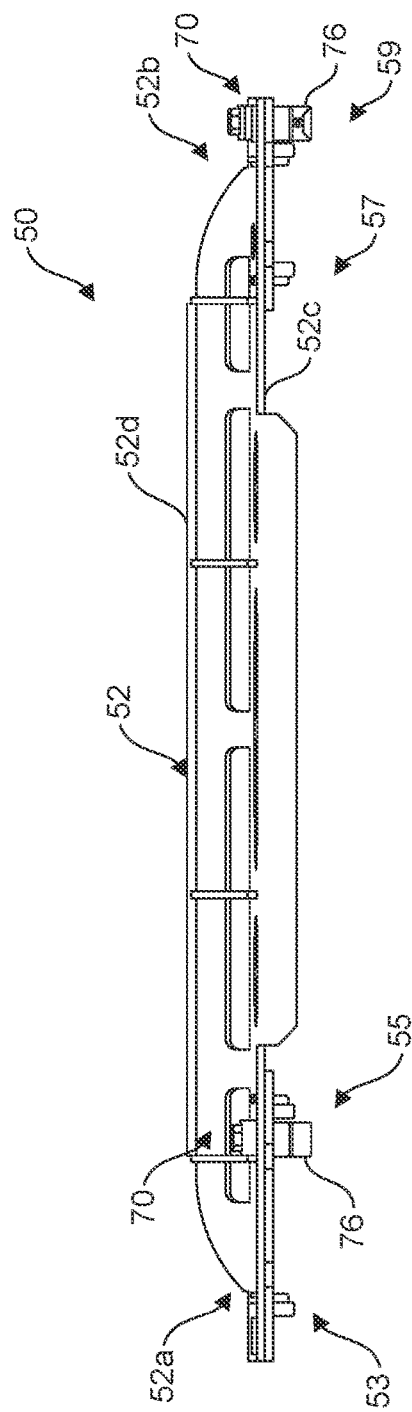
Figure 8D:
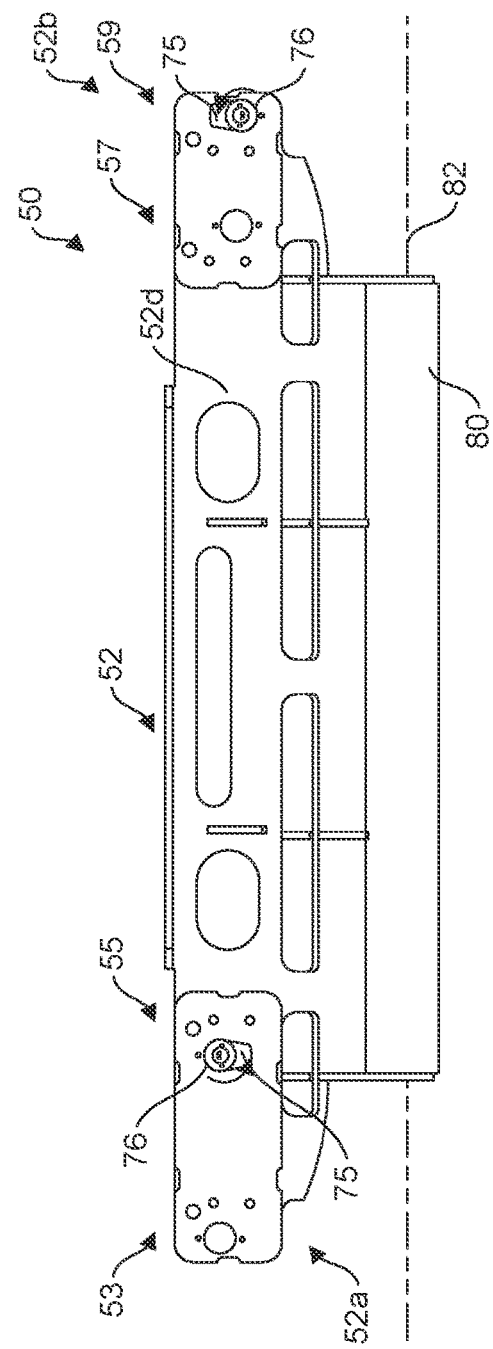

FIG. 6 is an enlarged/exploded view of end 52b of support plate 52, including clamp assembly 70, with FIG. 7 being an exploded view of clamp assembly 70, according to one example. Clamp assembly 70 includes a clamp housing 72 having a bushing 74 that extends through support plate 52 from rear surface 52d toward front surface 52c. A rotary clamp head 76 includes a shaft 77 that inserts into bushing 54 and receives a bolt 59 via internal threading, with shaft 77 including a notch 78 that receives a stop pin 73 that inserts through clamp housing 72 and which limits rotary clamp head 76 to a quarter-turn (i.e., 90-degrees) when turning clamp head 76 via rotation of bolt 79. Rotary claim head 76 further includes a finger or flange 75 for engaging corresponding mounting flange 40b of reel-type mower unit 30 (see FIG. 3).

When mounting clamp assembly 70 to support plate 52, bushing 74 of clamp housing 72 passes through corresponding clamp orifice 64, with clamp housing 72 being secured to rear side 52b of support plate 52 via fasteners 71a and 71b. Shaft 77 of clamp head 76 is then slid into bushing 74 from front surface 52c of support plate 52 and threaded to bolt 79. Clamp head 76 can then be rotated ¼ turn within bushing 74. As described in greater detail below, when installed on frame structure 38 of reel-type mower unit 30, mounting flange 40b is secured between flange 75 of clamp head 76 and front surface 52c of support plate 52.

FIGS. 8A through 8D respectively illustrate perspective, side, top, and front views of grinding positioning plate 50 in an uninstalled position, according to one example. As illustrated, a clamp assembly 70 is shown as being mounted in the corresponding clamp orifice 64 of mounting point sets 55 and 59 (corresponding to 21-inch wide cutting reel, see FIG. 5B). In each case, clamp head 76 is shown as being in a vertical position, such that finger/flange 75 is in a vertical position, with directional arrows indicating the direction of ¼-turn (counter-clockwise in FIG. 8D) for flange 75 to engage corresponding mounting flange 40a/40b.

FIGS. 9A through 9D respectively illustrate perspective, side, top, and front views of grinding positioning plate 50 in an installed position on reel-type mower unit 30, according to one example. As illustrated by the side and top views of FIGS. 9B and 9C, after grinding positioning plate 50 is mounted to mounting flanges 40a and 40b of frame structure 38 of reel-type mower unit 30 using fixturing pins 60, 62a, and 62b, bolt 79 of clamp assembly 70 is tightened. When bolt 79 is tightened, rotary clamp head 76 is turned 90-degrees (¼ turn) so that flange/finger 75 is positioned behind the corresponding mounting flange 40a/40b of frame structure 38 of reel-type mower unit 30. As bolt 79 is tightened, rotary clamp head 76 and finger/flange 75 is drawn toward support plate 52, thereby pinching corresponding mounting flange 40a/40b of frame structure 38 of reel-type mower unit 30 between rotary claim head 76 and support plate 52, thereby securing grinding positioning plate 50 to reel-type mower unit 30.

Figure 9A:
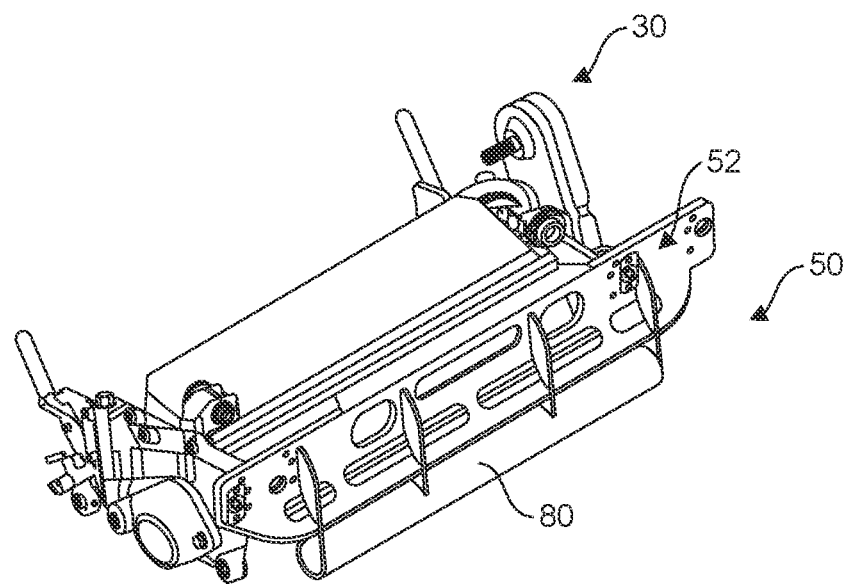
FIGS. 9A through 9D illustrate perspective, side, top, and front views of a grinding positioning plate for a reel-type mower unit in an installed position, according to one example.
Figure 9B:
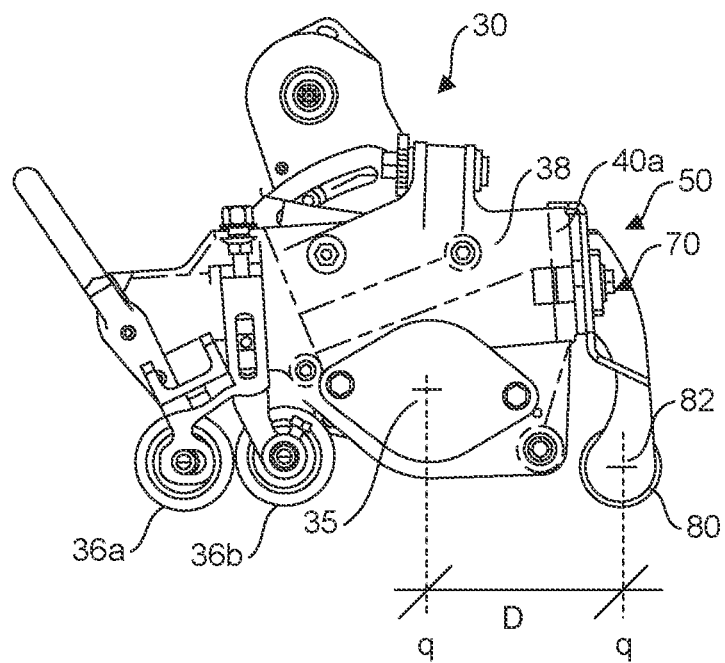
Figure 9C:
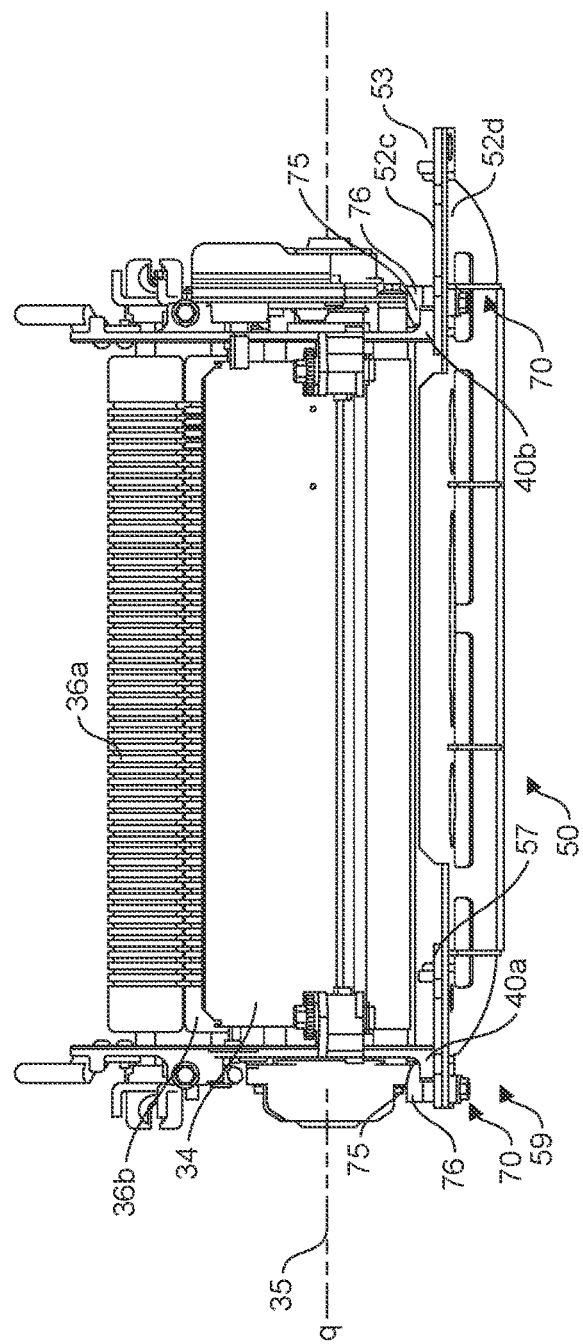
Figure 9D:
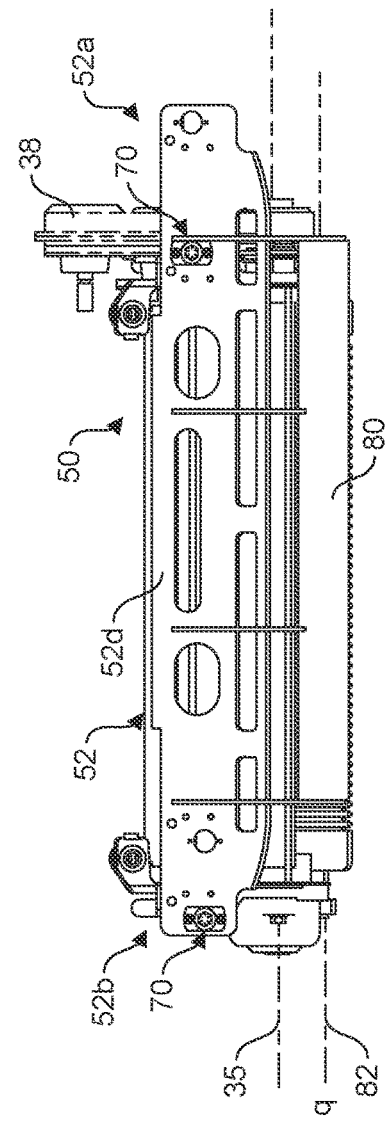

With reference to the side view of FIG. 9B, with grinding positioning plate 50 mounted to reel-type mower unit 30, the centerline (axis) 35 of cutting reel 34 is at a known distance, D, from the centerline 82 (axis) of the simulated rear roller 80 (or other pivot element). With this known distance, a grinding system, such as that described by U.S. Pat. No. 9,776,297, can clamp to pivot element 80 (e.g., simulated rear roller) so that reel-type mower unit 30 can be properly positioned relative to a grinding wheel(s) for optimal sharpening of cutting reel 34. Additionally, grinding positioning plate 50 provides rigidity to frame structure 38 when decoupled from drive assembly 34 (see FIG. 3), thereby improving the quality of sharpening.

Although illustrated with only two clamp assemblies 70, it is noted that, in other examples, there may be four clamp assemblies 70, one for each mounting point set 53, 55, 57, and 59, wherein only two of the clamp assemblies will be employed at any given time depending on the size of mower reel to which support plate 50 is to be mounted (e.g., 18-inch, 21-inch, and 26-inch).

Figure 10:
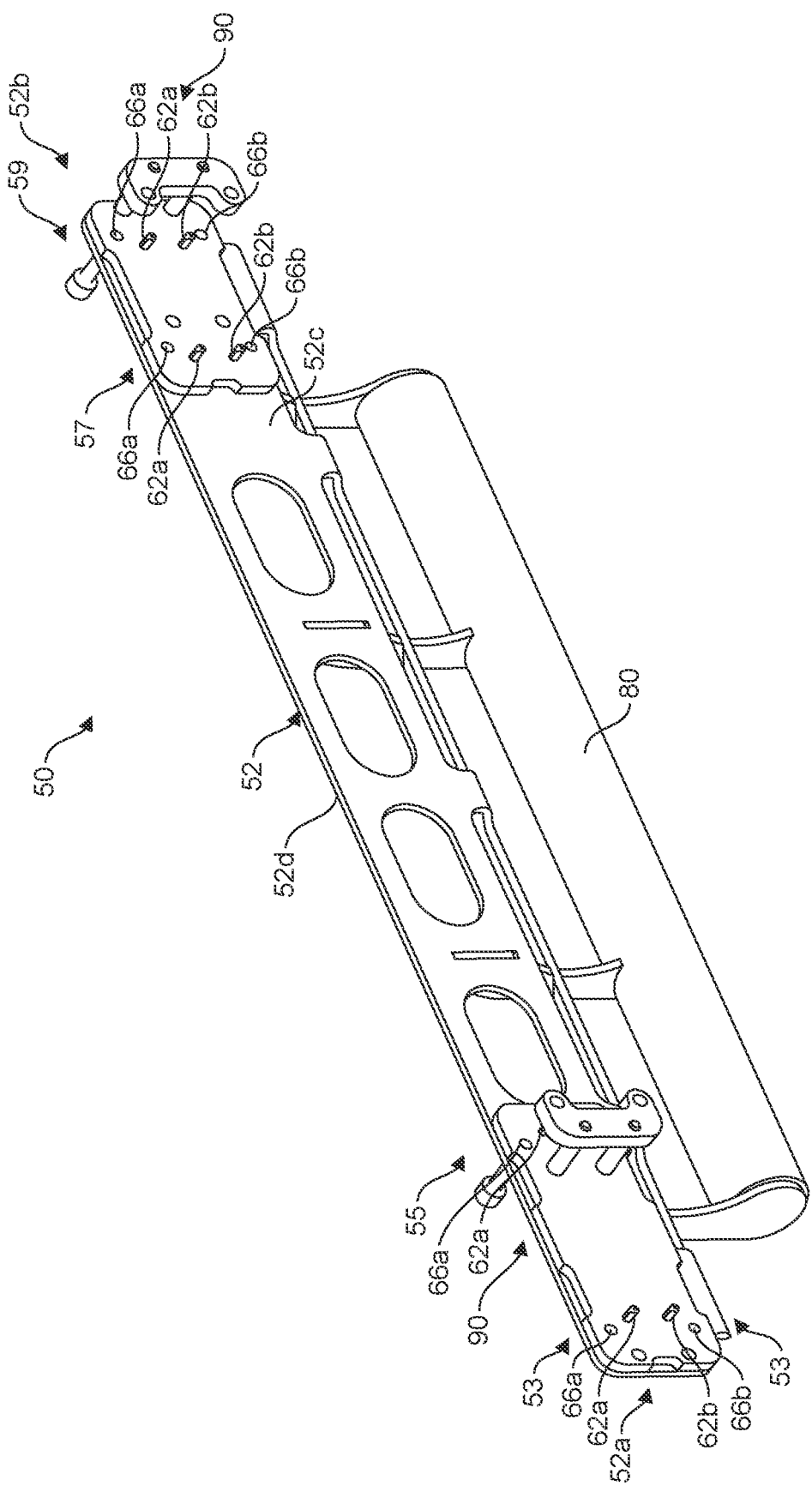
FIG. 10 is a perspective view illustrating a grinding positioning plate for a reel-type mower unit, according to one example.

FIGS. 10-13D illustrate an example of support plate 50 where the clamping assembly comprises a clamping plate assembly 90 in lieu of the rotary-type clamp assembly 70. FIG. 10 is a perspective view of grinding positioning plate 50, according to one example, where each mounting point set 53, 55, 57, and 59 includes fixturing pins 62a and 62b, where fixturing pins 62a and 62b are to engage and insert within fixturing pin aperture 42a and 42b of the corresponding mounting flange 40a/40b of frame structure 38 of reel-type mower unit 30, a first pair of clamp orifices 66a and 66b, and a second set of clamp orifices 68a and 68b, to receive bolts of clamping plate assembly 90.

Figure 11:
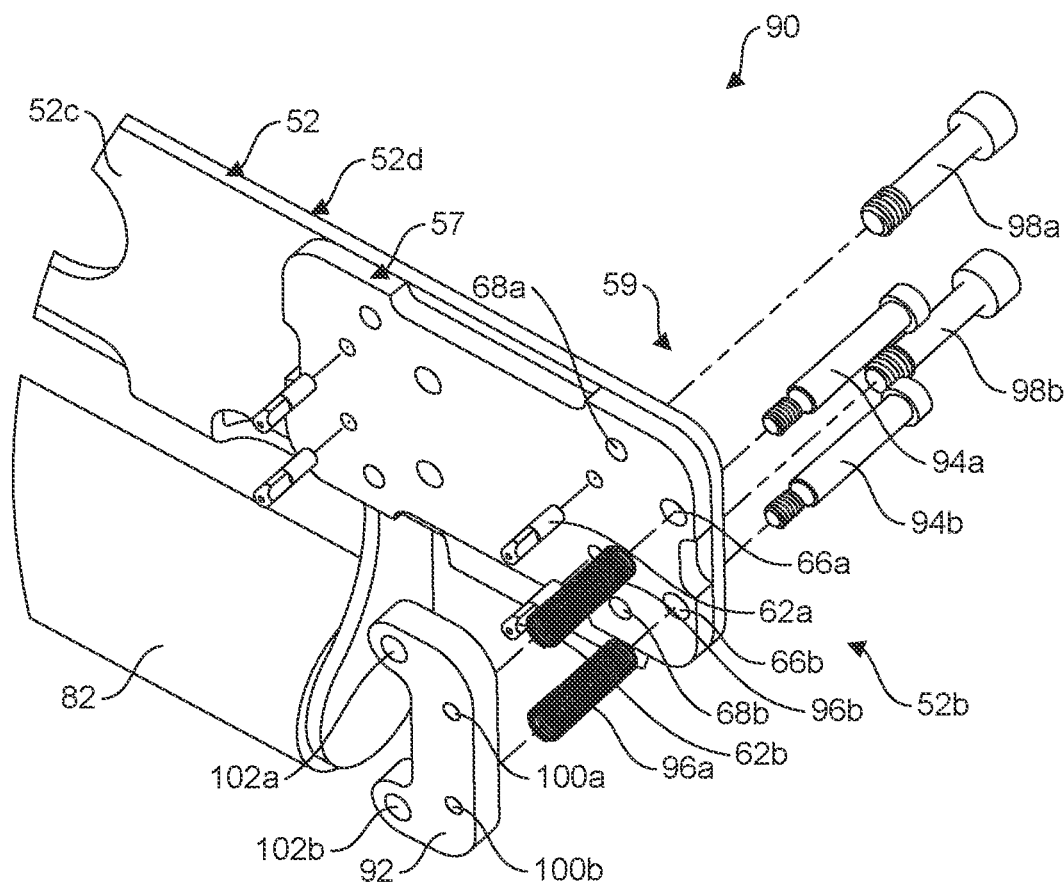
FIG. 11 is an exploded view of a portion of a grinding positioning plate including a clamping assembly, according to one example.
Figure 12A:
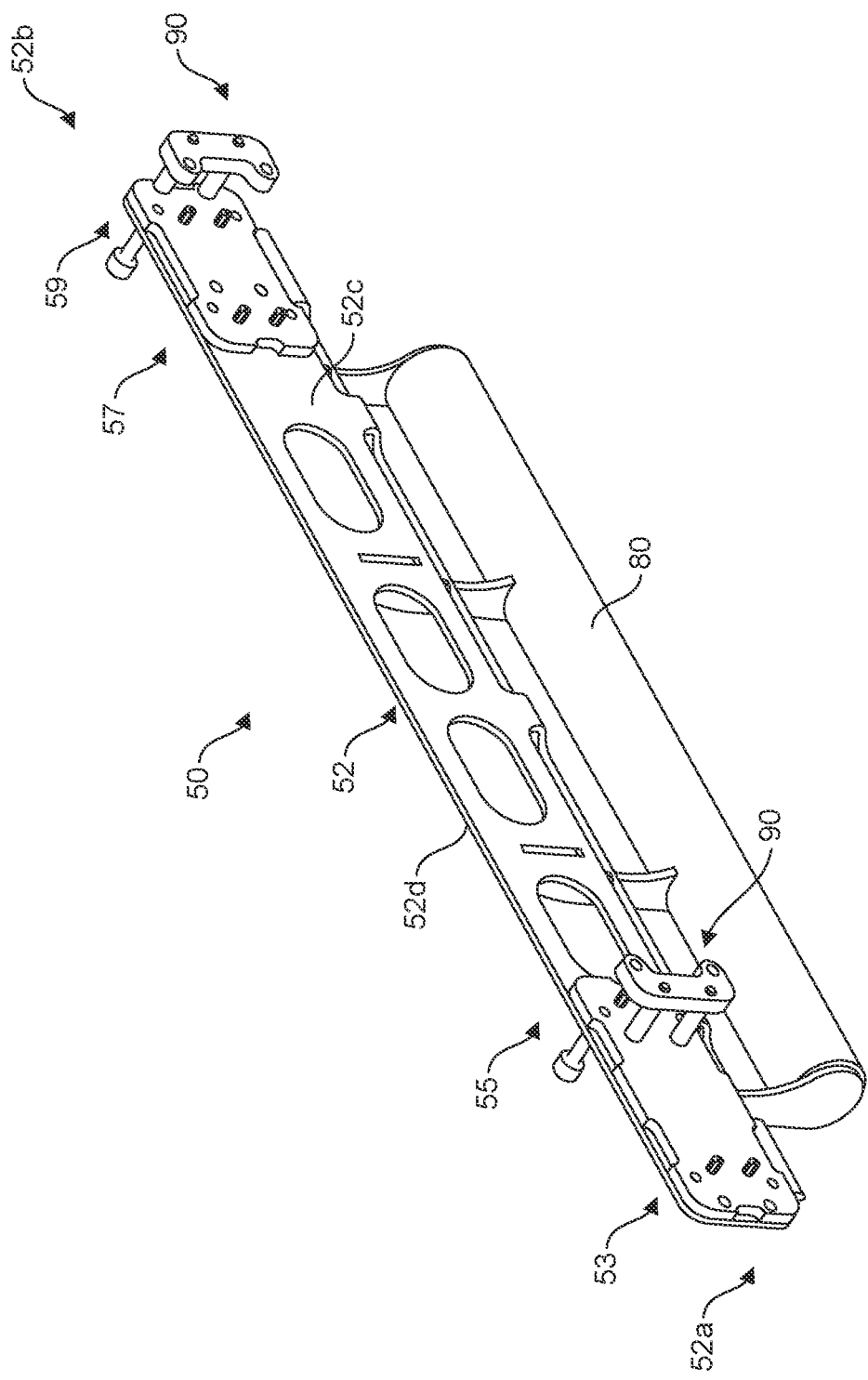
FIGS. 12A through 12D illustrate perspective, side, top, and front views of a grinding positioning plate for a reel-type mower unit in an uninstalled position, according to one example.
Figure 12B:
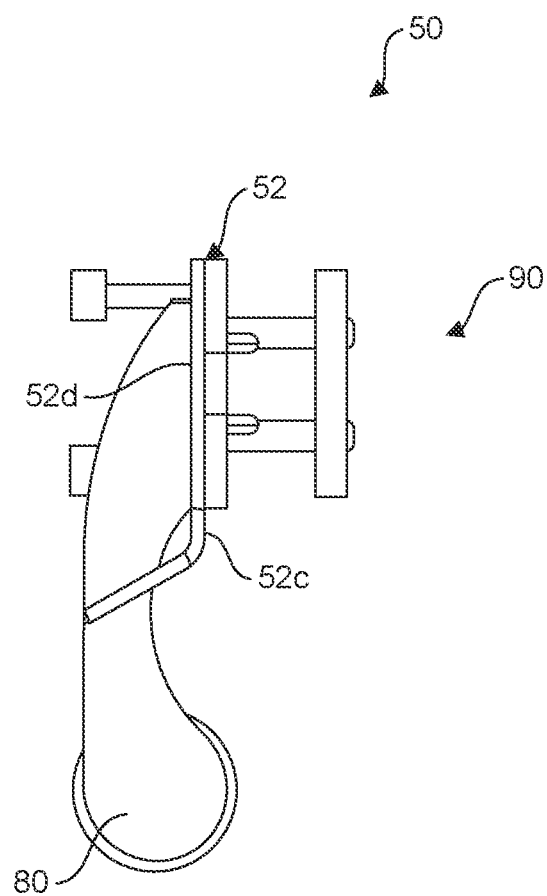
Figure 12C:
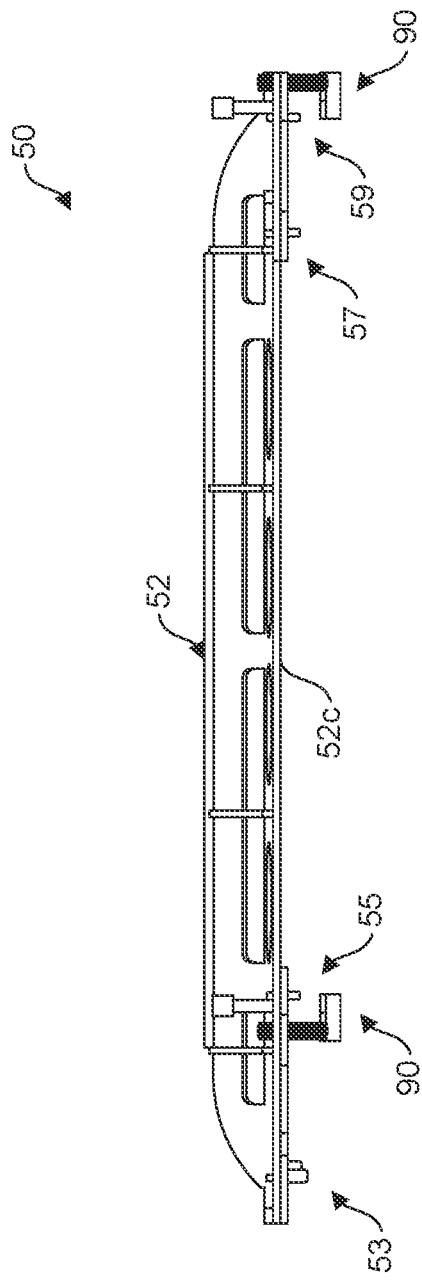
Figure 12D:
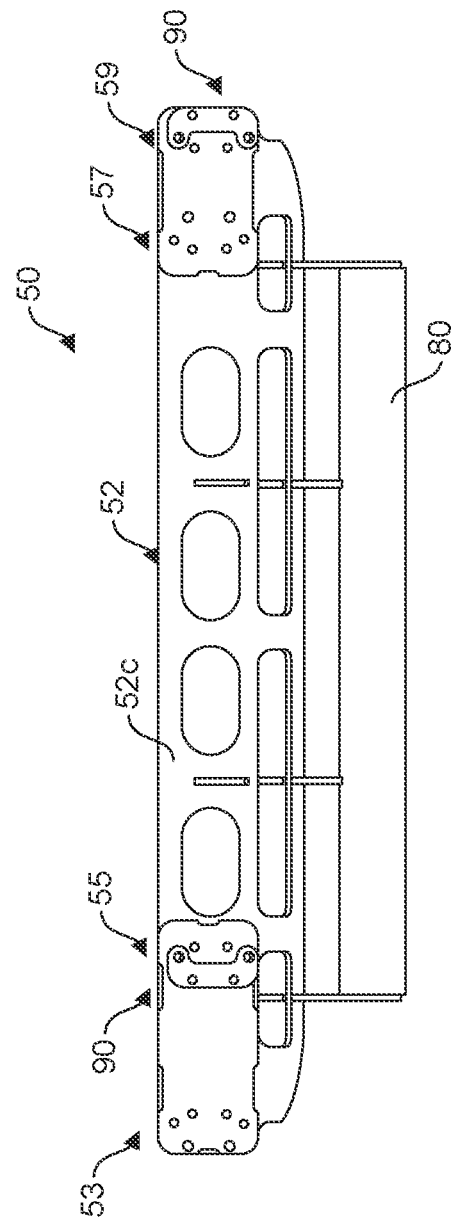

FIG. 11 is an enlarged/exploded view of end 52b of support plate 52 illustrating clamping plate assembly 90 in greater detail. With reference to FIG. 9, according to one example, clamping plate assembly 90 includes a clamp plate 92, a pair of shoulder bolts 94a, 94b, a corresponding pair of return springs 96a, 96b, and a pair of captive clamping bolts 98a, 98b. Shoulder bolts 94a, 94b pass through corresponding orifices 66a and 66b in support plate 52, pass through corresponding return springs 96a, 96b, and thread into corresponding threaded apertures 100a and 100b in clamp plate 92. Once threaded into clamp plate 92, shoulder bolts 94a, 94b are free to slide within the corresponding holes in support plate 52, and thereby slideably secure clamp plate 92 to support plate 52. Return springs 96a and 96b bias clamp plate 72 away from support plate 52 when in an uninstalled position. Captive clamping bolts 98a, 98b pass through corresponding apertures 68a and 68b in support plate 52, through the corresponding bolt holes 44a and 44b in corresponding mounting flange 40a/40b of frame structure 38 of reel-type mower unit 30 (see FIG. 3), and threaded into corresponding threaded apertures 102a and 102b in clamp plate 72.

FIGS. 12A through 13D respectively illustrate perspective, side, top, and front views of grinding positioning plate 50 in an uninstalled position, according to one example. As illustrated, a clamp plate assembly 90 is shown as being mounted at mounting point sets 55 and 59 (corresponding to 21-inch wide cutting reel, see FIG. 5B).

FIGS. 13A through 13D respectively illustrate perspective, side, top, and front views of grinding positioning plate 50 in an installed position on reel-type mower unit 30, according to one example. As illustrated by the side and top views of FIGS. 9B and 9C, when grinding positioning plate 50 is mounted to mounting flanges 40a and 40b of frame structure 38 of reel-type mower unit 30 using fixturing pins 62a and 62b, clamp plate 92 is positioned behind corresponding mounting flange 40a/40b of frame structure 38 of reel-type mower unit 30. Captive clamping bolts 98a, 98b are then inserted through the corresponding orifices in support plate 52, and through the corresponding bolt holes 44a/44b in corresponding mounting flange 40a/40b of frame structure 38 reel-type mower unit 30, and threaded into corresponding threaded apertures 102a and 102b in clamp plate 92. As captive clamping bolts 98a and 98b are tightened, clamp plate 92 is drawn toward support plate 52, thereby pinching corresponding mounting flange 40a/40b of frame structure 38 between clamp plate 92 and support plate 52, thereby securing grinding positioning plate 50 to reel-type mower unit 30, such as illustrated by the top view of FIG. 13.

Figure 13A:
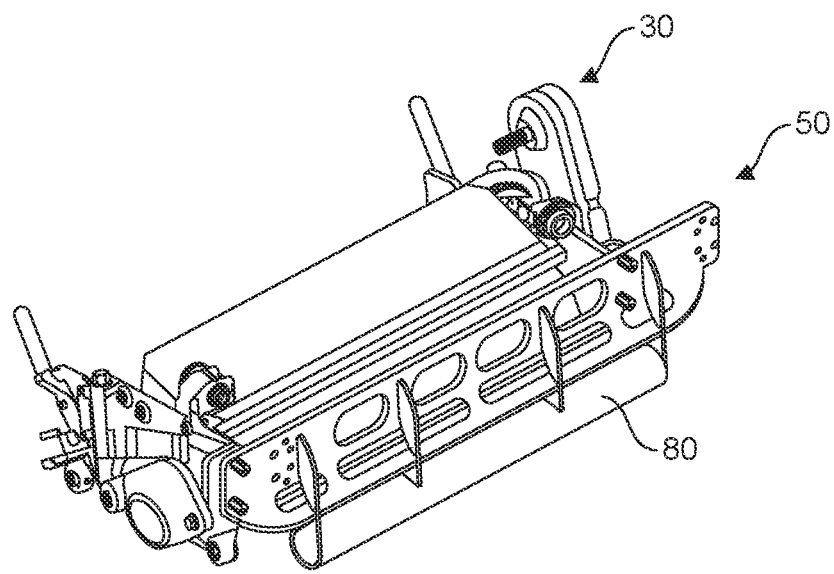
Figure 13B:
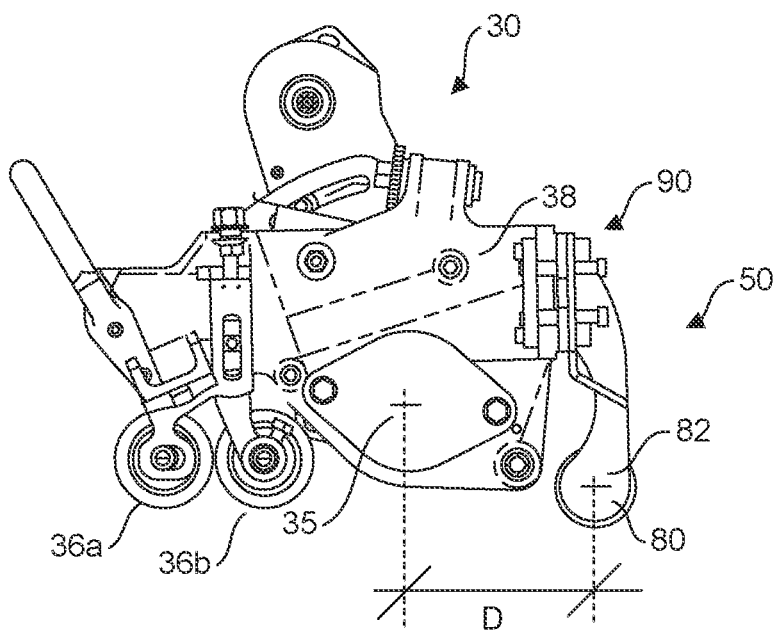

With reference to the side view of FIG. 13B, with grinding positioning plate 50 mounted to reel-type mower unit 30, the centerline (axis) 35 of cutting reel 34 is at a known distance, D, from the centerline 82 (axis) of the simulated rear roller 80 (or other pivot element). With this known distance, a grinding system, such as that described by U.S. Pat. No. 9,776,297, can clamp to pivot element 80 (e.g., simulated rear roller) so that reel-type mower unit 30 can be properly positioned relative to a grinding wheel(s) for optimal sharpening of cutting reel 34. Additionally, grinding positioning plate 50 provides rigidity to frame structure 38 when decoupled from drive assembly 34 (see FIG. 3), thereby improving the quality of sharpening.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A grinding positioning plate to selectively attach to reel-type mower units including a cutting reel having a rotational axis and first and second frame flanges disposed at opposite ends of the cutting reel including frame apertures for attaching the reel-type mower unit to a mower, the grinding positioning plate comprising:
   an elongated support body extending longitudinally between opposing first and second ends, the support body including:
      at least three mounting point sets spaced longitudinally apart on the elongated support body between the opposing first and second ends, each mounting point set comprising a plurality of pins extending from the support body and arranged to align with and be inserted into the frame apertures of a corresponding one of the first and second frame flanges to mount the elongated support body to the reel-type mower unit, wherein different pairs of mounting point sets correspond to different widths of reel-type mower units; and
      a pivot element supported from the elongated support body and having a pivot axis extending in parallel with the elongated support body and perpendicularly to the plurality of pins of the mounting point sets, the pivot element to serve as a clamping point for an automated grinding machine; and
   at least one pair of clamping assemblies, each clamping assembly to clamp to a different one of the first and second frame flanges to secure the elongated support body to the reel-type mower unit such that the pivot axis is in parallel with the rotational axis and at a known horizontal distance from the rotational axis.

2. The grinding positioning plate of claim 1, the pivot element comprising a cylindrical element, wherein a longitudinal axis of the cylindrical element is the pivot axis.

3. The grinding positioning plate of claim 1, wherein each clamping assembly of the at least one pair of clamping assemblies clamps the corresponding one of the first and second frame flanges between a clamping plate and the elongated support body.

4. The grinding positioning plate of claim 3, wherein each mounting point set includes a body aperture extending through the elongated support body which aligns with a frame aperture extending through the corresponding one of the first and second frame flanges, and wherein each clamping assembly comprises:
   a rotary clamp head; and
   a bolt to extend through the clamping plate, through the body aperture of the elongated plate, through the frame aperture in the corresponding one of the first and second frame flanges, and into the rotary clamp head, wherein when turned in a first rotary direction the rotary clamp head pulls the bolt toward the rotary clamp head to draw the clamping plate and elongated support body toward the rotary clamp head to clamp the corresponding one of the first and second frame flanges between the elongated support body and the rotary clamp head, and when turned in a second rotary direction to push the bolt away from the rotary clamp head to unclamp the corresponding one of the first and second frame flanges from between the elongated support body and the rotary clamp head.

5. The grinding positioning plate of claim 3, wherein each clamping assembly includes:
   a pair of shoulder bolts extending through corresponding apertures in the elongated support body, each shoulder bolt threaded into a corresponding threaded opening in the clamping plate, and each shoulder bolt having a biasing spring disposed there about which is disposed between the clamping plate and the elongated support body to bias the clamping plate away from the elongated support body toward an unclamped position, the shoulder bolts able to slide within the corresponding apertures in the elongated support body; and
   a pair of tightening bolts to extend through corresponding apertures in the elongated support body and corresponding ones of the frame apertures in the corresponding one of the first and second frame flanges, each tightening bolt to thread into a corresponding threaded opening in the clamping plate, when the tightening bolts are turned in a tightening direction the tightening bolts to overcome the biasing springs and to draw the clamping plate toward the elongated support body to clamp the corresponding one of the first and second frame flanges between the clamping plate and the elongated support body, and when turning in a loosening direction to unclamp the corresponding one of the first and second frame flanges from between the clamping plate and the elongated support body with the biasing springs to bias the clamping plate away from the elongated support body to the unclamped position.

6. The grinding positioning plate of claim 1, wherein each mounting point set includes at least two fixturing pins extending from the elongated support body which are arranged to align with corresponding fixturing apertures in the corresponding one of the first and second frame flanges.

7. The grinding positioning plate of claim 6, wherein each mounting point set includes a rough alignment pin, wherein for each mounting point set the rough alignment pin is longer than the at least two fixturing pins, and wherein the rough alignment pin is configured to fit more loosely into the corresponding frame aperture of the corresponding one of the first and second frame flanges than the at least two fixturing pins.

8. The grinding positioning plate of claim 1, including four sets of mounting point sets including first and second mounting point sets disposed proximate to opposing first and second ends of the elongated support body, a third mounting point set disposed between the first and second mounting point sets, and a fourth mounting point set disposed between the third and second mounting point sets, wherein the first and second mounting point sets are to respectively engage frame apertures in the first and second frame flanges of a reel-type mower unit of a first width, wherein the second and third mounting point sets are to respectively engage frame apertures in the first and second frame flanges of a reel-type mower unit of a second width, wherein the third and fourth mounting point sets are to respectively engage frame apertures in the first and second frame flanges of a reel-type mower unit of a third width, wherein the first width is greater than the second width, and the second width is greater than the third width.

* * * * *